March 17, 1942.  F. ASHWORTH  2,276,913

MECHANISM FOR CONVERTING MOTION

Filed Dec. 17, 1941

Witness
H. E. Van Dine

Inventor
Fred Ashworth
By his attorney

Patented Mar. 17, 1942

2,276,913

UNITED STATES PATENT OFFICE 2,276,913

MECHANISM FOR CONVERTING MOTION

Fred Ashworth, Wenham, Mass., assignor to United Shoe Machinery Corporation, Flemington, N. J., a corporation of New Jersey Application December 17, 1941, Serial No. 423,348

5 Claims. (Cl. 74—578)

This invention relates to a mechanism for converting an oscillatory motion into an intermittent unidirectional rotary motion and is designed especially to drive a shaft forwardly, intermittently and positively from an oscillating member, with only a limited amount of lost motion.

The object of the invention is to provide a mechanism for the above purpose which will be simple in construction, inexpensive to assemble and in which all of the parts can be retained in assembled position without the use of screws, pins or other small fastenings.

Figure 1:
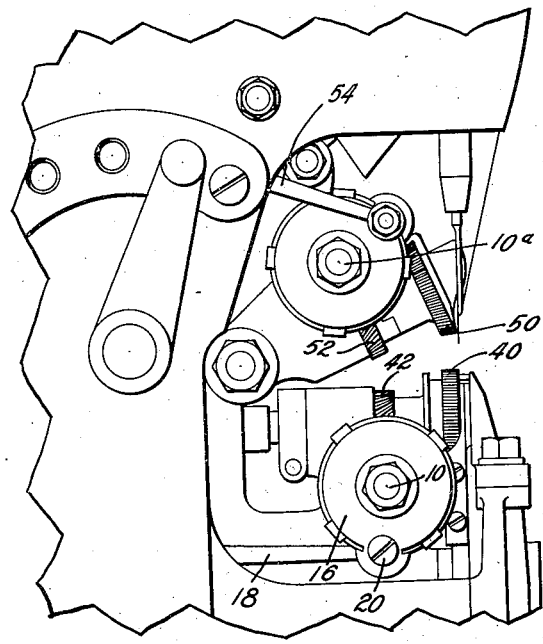
Fig. 1 is a side elevation of a portion of a machine for lasting stitchdown shoes by the use of thread, in which machine, among others, the mechanism may be used.
Figure 2:
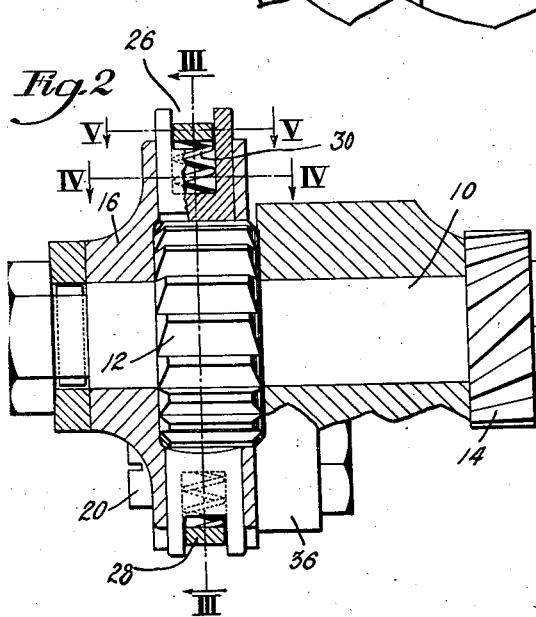
Fig. 2 is a vertical longitudinal section on the line II—II of Fig. 3, looking in the direction of the arrows and showing a ratchet wheel secured to a driving shaft with a pawl mechanism associated therewith, a novel means for retaining the parts in position being included.
Figure 3:
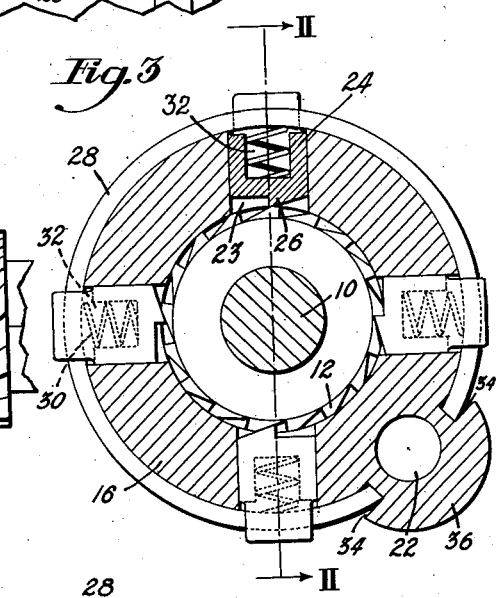
Fig. 3 is a section transverse of the shaft, taken along the line III—III of Fig. 2, and looking in the direction of the arrows.
Figure 4:
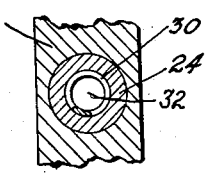
Fig. 4 is a section along the line IV—IV of Fig. 2, looking downwardly.
Figure 5:
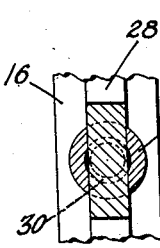
Fig. 5 is a section along the line V—V of Fig. 2, looking downwardly.

As illustrated herein, the mechanism for converting oscillatory motion into an intermittent unidirectional rotary motion is applied to two shafts 10 and 10ᵃ of the machine which is illustrated, in part, in side elevation in Fig. 1. The mechanism, as applied to shaft 10, will now be described.

The shaft 10 carries fixed thereto a ratchet wheel 12 by which it is driven intermittently by the pawl mechanism of the present invention and it also carries a helical gear 14 by which the feed mechanism of the machine is driven. Loosely mounted upon the shaft 10 is an oscillating member or carrier 16 driven by a reciprocating rod 18 which connects with a bolt 20 passing loosely through a bore 22 in said carrier.

The carrier 16 is provided with the pawl mechanism referred to above. In the illustrated construction four radial bores 23 are spaced at 90° apart around the carrier. In each of the bores is slidingly mounted a cylindrical pawl 24 having a diametrical tooth 26 on its inner end to engage the teeth of the ratchet wheel 12.

Each pawl is provided at its outer end with a slot 26 lying at right angles to its tooth. A flat circumferential band 28, having its ends spaced apart, so that it is C-shaped, is arranged to lie in the slots 26 of all of the pawls. This band provides a simple means for retaining the pawls and for alining their teeth. It also serves as an abutment for the outer ends of coil springs 30 which are mounted in longitudinal bores or sockets 32 in the bottoms of the slots. These springs maintain the teeth of the pawls in engagement with the teeth of the ratchet wheel.

The number of teeth in the ratchet wheel may be one more or one less than a multiple of the number of pawls. In the illustrated construction there are seventeen teeth and four pawls. Accordingly, the carrier needs to be moved only a quarter of a tooth or less to bring some one of the pawls into driving engagement with a tooth of the ratchet wheel. This reduces the lost motion to a minimum and provides a strong, positive mechanism to transmit the motion of the carrier through the shaft 10 and gear 14 to the feed mechanism of a machine.

There are no screws, pins or other small fastenings required to retain the circumferential band 28 in position in the carrier for the reason that the spaced ends of the C-shaped band are arranged to enter slots 34 in a boss 36 through which the connecting bolt 20 passes. Thus rotation of the band relatively to the carrier is prevented and all parts are retained in position.

In assembling the device, the ends of the circumferential band 28 are located in the slots 34 and before the ratchet wheel is placed within the center of the carrier, the springs 30 and pawls 24 are inserted in the bores 23 from the center of the carrier, with the sides of the slots in the pawls engaging the circumferential band 28. With the springs 30 compressed, the ratchet wheel and shaft can be easily positioned within the center of the carrier and the pawls can then be released into operative engagement with the teeth of the ratchet.

The stitchdown thread lasting machine illustrated in Fig. 1 is provided with two feed wheels. The lower one, indicated at 40, is driven by a helical gear 42 which meshes with the helical gear 14 on the shaft 10 and which is described above. The upper feed wheel 50 is driven by a helical gear 52 and a similar mechanism, including the shaft 10ᵃ and a reciprocating rod 54.

Having described my invention, what I claim as new and desire to secure by Letters Patent of the United States is:

1. A mechanism for converting an oscillatory motion into an intermittent unidirectional rotary motion, having in combination, a shaft, a ratchet wheel fixed on the shaft, an oscillatory carrier loose on the shaft, radial pawls movably mounted in the carrier, coil springs for maintaining the teeth of the pawls in contact with the teeth of the ratchet, a single C-shaped means for maintaining the pawls and coil springs in position in the carrier, and means to prevent rotation of the C-shaped means relatively to the carrier.

2. A mechanism for converting an oscillatory motion into an intermittent unidirectional rotary motion, having in combination, a shaft, a ratchet wheel fixed on the shaft, an oscillatory carrier loose on the shaft, radial pawls movably mounted in the carrier, coil springs for maintaining the teeth of the pawls in contact with the teeth of the ratchet, slots in the pawls, and a circumferential band positioned in the slots in the pawls to secure them against rotation and to retain them and the coil springs in position in the carrier.

3. A mechanism for converting an oscillatory motion into an intermittent unidirectional rotary motion, having in combination, a shaft, a ratchet wheel fixed on the shaft, an oscillatory carrier loose on the shaft, radial pawls movably mounted in the carrier, coil springs for maintaining the teeth of the pawls in contact with the teeth of the ratchet, slots in the pawls, a circumferential band positioned in the slots in the pawls to secure them against rotation and to retain them and the coil springs in position in the carrier, and means on the carrier to maintain the circumferential band in fixed position on the carrier.

4. A mechanism for converting an oscillatory motion into an intermittent unidirectional rotary motion, having in combination, a shaft, a ratchet wheel for rotating the shaft, a carrier, means for oscillating the carrier, radial bores in the carrier, a cylindrical pawl slidingly mounted in each of said bores, each pawl being provided on its inner end with a diametrical tooth and on its outer end with a diametrical guiding slot at right angles to the tooth and with a cylindrical socket at the bottom of the slot, a coil spring in each socket for maintaining the pawl in contact with the ratchet, and a single retaining means for alining all of said slots and for engaging all of said springs.

5. A mechanism for converting an oscillatory motion into an intermittent unidirectional rotary motion, having in combination, a shaft, a ratchet wheel for rotating the shaft, a carrier, means for oscillating the carrier, radial bores in the carrier, a cylindrical pawl slidingly mounted in each of said bores, each pawl being provided on its inner end with a diametrical tooth and on its outer end with a diametrical slot at right angles to the tooth and with a cylindrical socket at the bottom of the slot, a coil spring in each socket for maintaining the pawl in contact with the ratchet, a circumferential band having separated ends and positioned in the slots in the pawls to secure them against rotation and to retain the coil springs in position in the sockets, and slots in the carrier to hold the separated ends of the circumferential band on the carrier.

FRED ASHWORTH.